Jan. 11, 1949.   H. W. HASTINGS-HODGKINS   2,459,074
COURSE AND HEIGHT INDICATOR FOR AIRCRAFT
Filed May 1, 1943   2 Sheets-Sheet 1
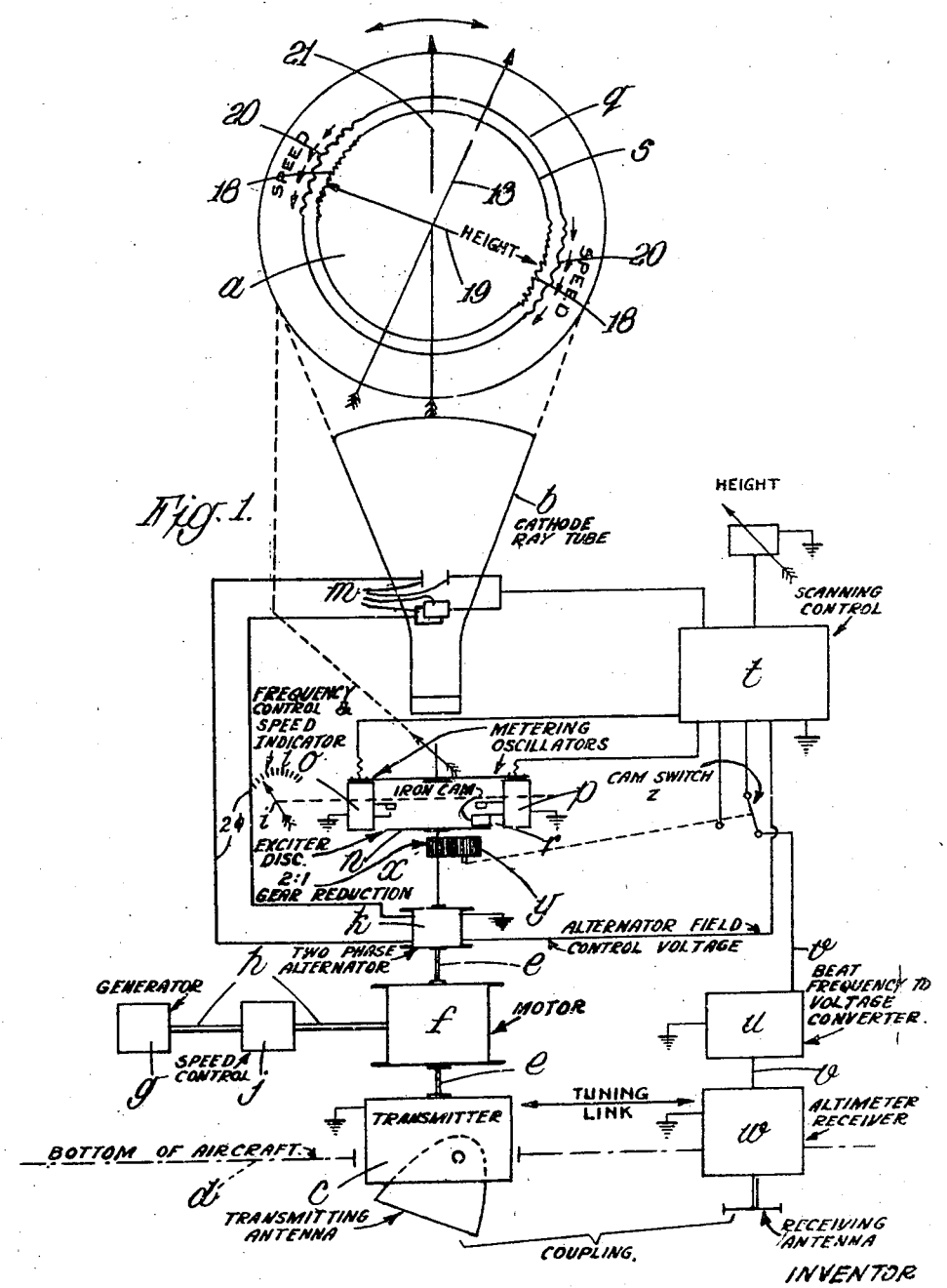

Jan. 11, 1949.      H. W. HASTINGS-HODGKINS      2,459,074
COURSE AND HEIGHT INDICATOR FOR AIRCRAFT
Filed May 1, 1943                               2 Sheets-Sheet 2
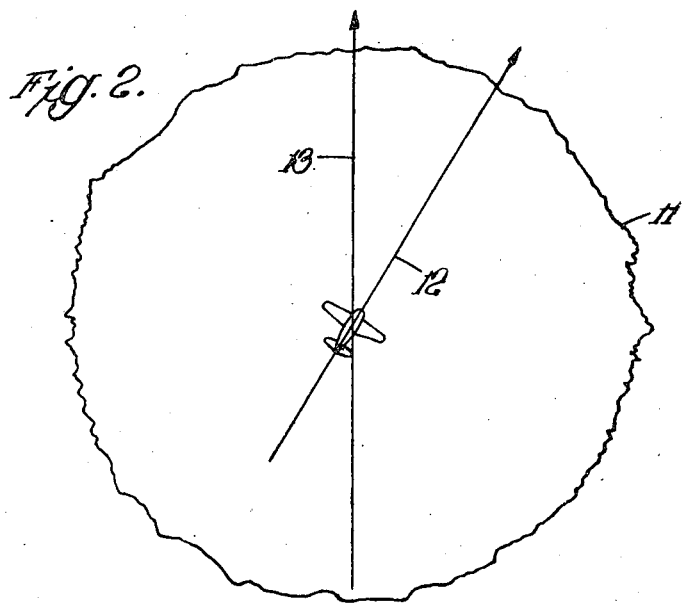
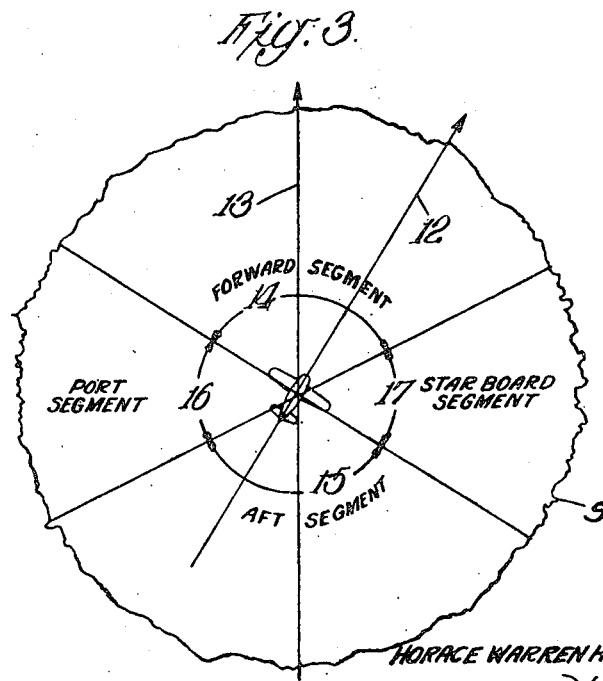
INVENTOR
HORACE WARREN HASTINGS-HODGKINS
BY
ATTORNEY Patented Jan. 11, 1949

2,459,074

UNITED STATES PATENT OFFICE 2,459,074

COURSE AND HEIGHT INDICATOR FOR AIRCRAFT

Horace Warren Hastings-Hodgkins, Lincoln, England, assignor to Radio Corporation of America Application May 1, 1943, Serial No. 485,562
In Great Britain July 3, 1942

6 Claims. (Cl. 343—9)

1

A radio altimeter of the frequency wobbling type is a device for indicating the altitude of aircraft by means of radio waves. In this device radio waves are transmitted from the aircraft towards the earth and the frequency of these waves is varied between predetermined limits simultaneously with the variation in tuning of a receiver also located on the aircraft and arranged to receive both directly from the transmitter and also indirectly from said transmitter via reflection at the earth's surface. The result of the two receptions is a beat the frequency of which is a function of the difference in time taken by the direct and reflected energies to reach the receiver and also, therefore, a function of the height of the aircraft above the earth.

The object of the present invention is to adapt such a device for the purpose of indicating to the pilot of the aircraft his true course, and preferably also his speed, without reference to wireless beacons or visual bearings.

To this end and in accordance with the invention the transmitter of such a radio altimeter is arranged to emit a rotating beam which, as the aircraft advances, will strike the earth on a cyclic curve, and means are provided for setting a "true course" indicator relatively to a scanning screen on which the resultant signals appear.

The emission of the beam in the required manner may be effected by inclining the axis of the transmitter to an axis (preferably vertical) about which it is rotated bodily, whilst the setting of the "true course" indicator may be effected by rotation of a disc-like scanning screen on which the "true course" indicator appears as a radial or diametral line which, for ease in setting, is preferably located at right angles to a diametral setting line which, as will be explained hereinafter, may constitute a "height" scale.

The signals may be caused to appear on the scanning screen by means of a cathode ray tube disposed therebeneath and connected through a scan control with the receiver of the device, the signals appearing as a rough circle the mean diameter of which corresponds with the mean height of the aircraft above the earth. If the signals appearing on the screen could be plotted for each revolution of the transmitter the forward and aft segments of the successive circles would be of undulating form and would indicate successive variations of height due to the contours of the ground over which the aircraft passes, whilst the port and starboard segments of the successive circles would be of a "ripple" form and would indicate a pair of sections of the

2 ground along the true course of the aircraft, any given point in a port or starboard segment on one circle being displaced aft on the succeeding circle to an extent proportional to the speed of the aircraft. Hence on the scanning screen the "waves" of the port and starboard segments will pass aft at a speed proportional to the true speed of the aircraft, and if the scanning screen be rotated so that the setting line intersects the port and starboard segments of the rough circle at the points of highest speed the indicator line (which is at right angles thereto) will indicate the "true course" of the aircraft.

To facilitate the selection of these points of highest speed there may be caused to appear on the scanning screen a second concentric rough circle (which may be termed the "metering scan" in contradistinction to the "signal scan"), having two diametrically opposite segments in which an artificial "ripple" is produced by means which will enable such segments to be displaced angularly to correspond with the signal "ripple," and these means may be coupled with the scanning screen so that the latter is turned as said means are employed, and if a fixed indicator be provided on the fore and aft axis of the aircraft the angle between said fixed and "true course" indicators may be observed, thus showing the angular variation between the "apparent" and "true" course.

It is desirable that the speed of the metering "ripple" should be variable so that it may be caused to match that of the signal "ripple."

As mentioned above the mean diameter of the signal scan or circle corresponds with the mean height of the aircraft above the earth, hence, if the setting line of the screen be graduated it may serve as a height indicator. Alternatively, means may be provided for varying the diameter of the metering scan or circle, so that when the metering circle is brought into coincidence with the signal circle a movable member (which may be an index movable in relation to a fixed scale, or a scale movable in relation to a fixed index), forming part of said means, will indicate the height of the aircraft.

The invention is illustrated by the accompanying drawings, wherein Figure 1 is a diagrammatic representation of one form of the apparatus, the apparatus being in elevation and its screen being relatively enlarged and shown in plan; Figure 2 represents in roughly circular form (as if the aircraft were stationary whilst the transmitter and reflector make one revolution) the path of the beam as it strikes the ground, the radial variations being due to inequalities on the surface of the ground; whilst Figure 3 represents in a similar manner the signals received on the screen of the apparatus.

As illustrated in Figure 1, the apparatus for carrying out the invention comprises a revolvable disc-like transparent scanning screen $a$ superposed over the fluorescent screen of a cathode ray tube $b$ therebeneath; a transmitting aerial $c$ and reflector (or the entire transmitter with aerial) mounted to project through the bottom $d$ of the aircraft and to be rotated on a vertical shaft $e$ at a constant speed by a repulsion motor $f$ receiving current from a generator $g$ and controlled in a known manner by a circuit $h$ including a motor speed controller $j$ which corrects for variations in supply voltage or load; a two phase alternator $k$ on the shaft $e$ to provide the relatively rotating potentials at the cathode ray plates $m$ and an exciter disc $n$ to bring two metering oscillators $op$ into operation at the desired points on the metering scan or circle $c$ on the screen $a$. These metering oscillators $op$ may be of any conventional type, and are rotatable around the axis of the motor shaft $e$ as indicated by the arrow $i$ by means of a hand control (not shown) movable relatively to a scale graduated in degrees and minutes, and they are switched or brought into operation individually under the influence of a soft iron cam $r$ on the exciter disc $n$. The frequency generated is adjusted in each oscillator $op$ by one of a pair of ganged condensers under hand control. Since the outputs of these oscillators $op$ are required to form the artificial "ripple" on the metering scan or circle $q$, one of the frequencies required will be higher than a multiple of, that of the "ripple" of the signal scan or circle $s$, and the other lower than such a multiple, and neither must be a multiple thereof; the rearwardly moving "ripple" thus produced at opposite sides of the metering scan or circle $q$ can be brought into angular correspondence with that at opposite sides of the signal scan or circle $s$ by suitable manual angular adjustment about the axis of the motor shaft $e$ of the pair of oscillators $op$.

The rotating impulse for the formation of the signal scan or circle $s$ is the output of the two phase alternator $k$, one phase being applied to each pair of plates $m$ in the cathode ray tube $b$. The amplitude of the field voltage of the alternator $k$ may be modified by the circuit of a scan control $t$ which may comprise any conventional voltage or current adjusting means in step with height variations passed on via the "beat frequency to voltage" device $u$ in a circuit $v$ from an altimeter receiver $w$. Hence large and permanent height readings will decide the diameter of the signal scan or circle $s$ and local variations will cause small humps and valleys in its circumference. Alternatively, the receiver circuit of the device shown in U. S. Patent 2,257,830, granted to Irving Wolff and Royden C. Sanders on October 7, 1941, provides D.-C. potentials which are applied to control the amplitude of A.-C. potentials impressed on an indicator.

The signal and metering scans $s$ and $q$ may be projected alternately by the cathode ray tube if a two-to-one reduction gear $xy$ driven by the motor shaft $e$ be provided to operate a cam switch $z$ to suppress the signal circuit and the metering circuit alternately via the scan control $t$.

When the speed of the "ripple" of the metering scan $q$ has been matched with that of the "ripple" of the signal scan $s$ the means for controlling the oscillators $op$ may be employed, in conjunction with a suitable scale $l$ to indicate the aircraft ground speed (i. e. its true speed).

Figure 2 shows at 11 the path along which the beam travels when it strikes the ground and, for the sake of simplicity this is represented in roughly circular form (i. e. as though the aircraft were stationary, whilst the transmitter $c$ makes one revolution) instead of as a cyclic curve, and it will be understood that the radial dimension at any part of this path 11 is increased if the beam strikes the ground at a depression therein or is decreased when it strikes at an eminence. Figure 3 represents in a similar manner at $s$ the signals received on the scanning screen $a$, and the mean diameter of the rough circle $s$ corresponds with the mean height of the aircraft above the earth. In Figures 2 and 3, 12 represents the apparent course of the aircraft, and 13 its true course. If the signals appearing as at $s$ on the screen $a$ could be plotted for each revolution of the transmitter $c$ the forward and aft segments 14 and 15 of the successive circles would be of undulating form and would indicate successive variations of height due to the contours of the ground over which the aircraft passes, whilst the port and starboard segments 16 and 17 of the successive circles would be of a "ripple" form and would indicate a pair of sections along the true course of the aircraft, any given point in a port segment 16 or a starboard segment 17 on one circle such as $s$ being displaced aft on the succeeding circle to an extent proportional to the speed of the aircraft. Hence, on the scanning screen $a$, Figure 1, the "waves" 18, 18 of the port and starboard segments 16 and 17 of the scanning circle $s$ will pass aft at a speed proportional to the true speed of the aircraft. In Figure 1 the "true course" indicator line 13 of the scanning disc $a$ is at right angles to a setting line 19, and if the disc $a$ be rotated so that the setting line 19 intersects the "waves" 18, 18 at the points of highest speed the indicator line 13 will indicate the "true course" of the aircraft.

To facilitate the selection of these points of highest speed there is caused to appear on the scanning disc $a$ the "metering scan" $q$ having two diametrically opposite segments 20, 20 in which an artificial "ripple" is produced by means of the exciter disc $n$ and the oscillators $op$, the artificial "ripple" enabling the segments 20, 20 to be displaced angularly to correspond with the waves 18, 18 and the hand control for rotating the oscillators $op$ around the axis of the motor shaft $e$ is coupled (by means indicated by a dashed line) with the scanning screen $a$ so that the latter is turned concurrently with said oscillators. 21, Figure 1, is a fixed indicator provided on the fore and aft axis of the aircraft and, in relation thereto, the 'true course" indicator 13 shows the angular variation between the "apparent" and "true" courses when the scanning screen $a$ is turned as just mentioned.

I claim:

1. In a radio avigational device for aircraft comprising, in combination, a radio transmitter having means for continuously emitting frequency modulated signals in a rotating beam which will strike the earth on a cyclic curve as the aircraft advances, means for generating a reference current in synchronism with said rotating beam, means for receiving said signals after reflection from the earth, means for combining said emitted signals with said received reflected signals, and indicating means responsive to the frequency and phase of said combined signals and said reference current for indicating simultaneously the speed, altitude and true course of said aircraft.

2. In a radio avigational device for aircraft comprising, in combination, a radio transmitter for continuously emitting frequency modulated signals in a rotating beam which will strike the earth on a cyclic curve as the aircraft advances, means for receiving said signals after reflection from the earth, means coupling said transmitter and said receiving means for combining said emitted signals with said received reflected signals, and an indicator responsive to said combined signals for indicating the altitude of said aircraft, the improvement comprising means cooperating with said indicator for indicating the true course of said aircraft, and means cooperating with said true course indicating means for indicating the speed of said aircraft.

3. In a radio avigational device for aircraft comprising, in combination, a radio transmitter for continuously emitting frequency modulated signals in a rotating beam which will strike the earth on a cyclic curve as the aircraft advances, means for receiving said signals after reflection from the earth, means coupling said transmitter and said receiving means for combining said emitted signals with said received reflected signals, and additional means including a cathode ray tube indicator responsive to said combined signals for indicating as a function of the diameter of a first circular cathode ray trace on said tube the altitude of said aircraft, the improvement comprising means cooperating with said additional means for generating a second concentric cathode ray trace on said tube for indicating the true course of said aircraft, and means for indicating as a function of the relative characteristics of said first and said second cathode ray traces the speed of said aircraft.

4. In a radio avigational device for aircraft comprising, in combination, a radio transmitter for continuously emitting frequency modulated signals in a rotating beam which will strike the earth on a cyclic curve as the aircraft advances, means for receiving said signals after reflection from the earth, means coupling said transmitter and said receiving means for combining said emitted signals with said received reflected signals, and additional means including a cathode ray tube indicator responsive to said combined signals for indicating the altitude of said aircraft as a function of the mean diameter of a first substantially circular cathode ray trace on said tube, the improvement comprising means cooperating with said cathode ray tube for cyclically and alternately suppressing said first trace and providing a second concentric cathode ray trace on said tube having known time characteristics for indicating on said indicator the true course of said aircraft, and means connected to said means cooperating with said cathode ray tube for indicating the speed of said aircraft.

5. In a radio avigational device for aircraft comprising, in combination, a radio transmitter for continuously emitting frequency modulated signals in a rotating beam which will strike the earth on a cyclic curve as the aircraft advances, means for receiving said signals after reflection from the earth, means coupling said transmitter and said receiving means for combining said emitted signals with said received reflected signals, and additional means including a cathode ray tube and a two phase generator having an output voltage responsive to the frequency of said combined signals for generating a first substantially circular cathode ray trace for indicating the altitude of said aircraft as a function of the mean diameter of said trace, the improvement comprising means cooperating with said additional means for cyclically and alternately suppressing said first trace and providing a second concentric cathode ray timing trace on said tube, means for adjusting said second trace with respect to said first trace for indicating the true course of said aircraft, and means including a pair of adjustable frequency heterodyne generators cooperating with said cooperating means for indicating the speed of said aircraft.

6. In a radio avigational device for aircraft comprising, in combination, a radio transmitter having means for continuously emitting frequency modulated signals in a rotating beam which will strike the earth on a cyclic curve as the aircraft advances, means for receiving said signals after reflection from the earth, means coupling said transmitter and said means for receiving for combining said emitted signals with said received reflected signals, and additional means including an indicator responsive to the frequency of said combined signals for indicating the altitude of said aircraft, the improvement comprising a pair of local timing generators, means connecting said generators to said indicator, means for cyclically and alternately indicating said combined signals and said timing signals, means for adjusting said timing signals with respect to said combined signals for indicating on said indicator the true course of said aircraft, and means for adjusting simultaneously the output frequencies of said timing generators with respect to the frequency of said combined signals for indicating the speed of said aircraft.

HORACE WARREN HASTINGS-HODGKINS.

REFERENCES CITED

The following references are of record in the file of this patent:

UNITED STATES PATENTS

| Number | Name | Date |
|---|---|---|
| 2,193,361 | Rice | Mar. 12, 1940 |
| 2,223,224 | Newhouse | Nov. 26, 1940 |